United States Patent
Baum et al.

(10) Patent No.: US 6,369,357 B1
(45) Date of Patent: Apr. 9, 2002

(54) IMPLEMENTATION SYSTEM FOR CONTINUOUS WELDING, METHOD, AND PRODUCTS FOR THE IMPLEMENTATION OF THE SYSTEM AND/OR METHOD

(75) Inventors: Gary Lee Baum, Diamondale; Anthony John Zaccagni, Grosse Pointe, both of MI (US)

(73) Assignee: Weld Aid Products Inc., Detroit, MI (US)

(*) Notice: Subject to any disclaimer, the term of this patent is extended or adjusted under 35 U.S.C. 154(b) by 0 days.

(21) Appl. No.: 09/499,199

(22) Filed: Feb. 7, 2000

(51) Int. Cl.[7] .............................. B23K 9/00; B23K 9/28
(52) U.S. Cl. ............... 219/136; 219/137.2; 219/137.43
(58) Field of Search ............................ 219/136, 137 R, 219/137.2, 137.43

(56) References Cited

U.S. PATENT DOCUMENTS

| | | | |
|---|---|---|---|
| 3,056,102 A | | 9/1962 | Cornell |
| 3,553,423 A | * | 1/1971 | Doxey .......................... 219/130 |
| 3,586,818 A | * | 6/1971 | Blake .......................... 219/137 |
| 3,803,381 A | * | 4/1974 | Bernard et al. ............. 219/130 |
| 4,439,658 A | * | 3/1984 | Schmidt et al. ............... 219/56 |
| 4,583,257 A | | 4/1986 | Bridges et al. ................ 15/93 |
| 4,609,804 A | * | 9/1986 | Kishi et al. .................... 219/74 |
| 4,733,050 A | | 3/1988 | Grafius |
| 4,778,976 A | | 10/1988 | Litt et al. .................... 219/136 |
| 4,838,287 A | * | 6/1989 | Matsui et al. .................. 134/1 |
| 4,869,458 A | * | 9/1989 | Susini et al. .................. 251/14 |
| 4,918,286 A | | 4/1990 | Boyer |
| 4,994,645 A | * | 2/1991 | Varenchuk et al. ......... 219/73.2 |
| 5,337,938 A | | 8/1994 | Gilbert ......................... 228/102 |
| 5,603,854 A | * | 2/1997 | Parry ....................... 219/137 R |
| 5,813,074 A | | 9/1998 | Liljeholm |
| 5,844,201 A | * | 12/1998 | Dibacco et al. .......... 219/137.43 |
| 5,965,039 A | * | 10/1999 | Kitahasi et al. ........... 219/121.5 |

FOREIGN PATENT DOCUMENTS

| | | | |
|---|---|---|---|
| JP | 4812323 | 2/1973 | ................ 12/112.9 |
| JP | 5847381 | 3/1983 | |
| JP | 5973186 | 4/1984 | |

* cited by examiner

Primary Examiner—Tom Dunn
Assistant Examiner—L. Edmondson
(74) Attorney, Agent, or Firm—Howard & Howard

(57) ABSTRACT

Various methods, systems and products are disclosed for providing an improved welding system which substantially improves the continuous operation of an automated welding system by increasing the amount of time between maintenance shutdowns. One of the disclosed method steps or system elements provides for dipping a welding nozzle [28 or 28a] and a portion of its related diffuser into a bath [12 or 12a] of fluid each time the automated welding system moves through a welding cycle. A product is also disclosed to best accomplish that step or element. Another method step or system element may include the removal of spatter accumulation via an electromagnetic field that magnetically pulls the spatter without direct contact with the nozzle or diffuser. A further disclosed method step or system element may include lubrication of the continuous electrode used for welding, and may also include a step or element prior to lubrication that involves cleaning the continuous electrode prior to adding lubricant. The steps or elements may vary as to whether or not they are included, or in what sequence. In each combination of method steps or system elements disclosed, however, a significant increase in time of continuous operation between maintenance shutdowns has occurred. A product is also disclosed that will hold various products as needed for the implementation of each disclosed system or method.

28 Claims, 5 Drawing Sheets

IMPLEMENTATION SYSTEM FOR CONTINUOUS WELDING, METHOD, AND PRODUCTS FOR THE IMPLEMENTATION OF THE SYSTEM AND/OR METHOD

BACKGROUND OF THE INVENTION

1. Field of the Invention

The subject invention relates to systems and/or methods of use for significantly increasing the amount of time between maintenance shutdowns in an automatic continuous welding application for an automated welding machine. Also disclosed are products which can be used to accomplish some of the steps of the processes or systems disclosed.

2. Description of the Prior Art

In the industry, various welding systems and processes are employed to weld two pieces of metallic material. Typically, a diffuision nozzle (or nozzles in the case of twin electrodes) of a continuous electrode is moved near an article or articles to be welded, and an arc is established between the continuous electrode and the article or articles to be welded, so as to raise the temperature of the article or articles to be welded to the point at which the parts locally melt. Throughout the welding process an inert gas is dispensed through a gas diffuser disposed adjacent the nozzle to keep the molten metal at the weld engulfed in a controlled atmosphere. The controlled atmosphere controls the characteristics of the weld deposit as well as excluding air. The three gases that cause the most difficulty in welding are oxygen, nitrogen, and hydrogen. When any welding process is used, the molten puddle creating the weld should be shrouded or shielded from the air in order to obtain a high quality weld deposit.

A problem typically arises with this type of welding whereby spatter builds up on the welding nozzle tip and gas diffuser. Spatter is developed as molten metal droplets from the molten metal being welded are expelled and strike against the nozzle tip and gas diffuser. The droplets of molten metal solidify and adhere to the surface of the nozzle tip and gas diffuser as deposits of spatter. When a significant amount of spatter accumulates on the surface of the nozzle tip and gas diffuser adjacent the nozzle, the flow of inert gas to the weld is disturbed and becomes uneven. This disturbance in the flow of the inert gas allows areas of the weld to be exposed to atmospheric air while in the molten stage, which will result in the deterioration of the strength and quality of the weld.

Conventionally, spatter is removed by using a brush as disclosed in Japanese Patent Application Laying Open Publication Ser. No. 59-73186 (1984), or by using a device with rotary blades to scrape the spatter from the nozzle as disclosed in Japanese Utility Model Application Laying Open Publication Ser. No. 5847381 (1983). However, the usefulness of these methods is limited as direct contact with the welding nozzle is likely to cause damage to the welding nozzle, and the brushing or scraping of the welding nozzle is extremely time and labor intensive. Another approach involves the use of ceramic welding nozzles, instead of metal welding nozzles, as disclosed in Japanese Utility Model Application Laying Open Publication Ser. No. 48-12323 (1973). However, even though the use of ceramic material reduces the amount of spatter accumulation, spatter removal must still be performed, and a ceramic welding nozzle is even more susceptible to damage when the spatter is removed by scraping or brushing. In all of these cases it is necessary for the operator to be in close proximity to the welding nozzle in order to remove the spatter, which may lead to injuries, such as when an operator is burned by the extremely hot welding nozzle while trying to clean it by hand.

In order to make the process more streamlined, and to reduce the danger to the operator, spatter may be removed from the welding nozzle by inserting the welding nozzle within an electromagnetic field that magnetically pulls the spatter accumulation from the welding nozzle. A product performing this function is disclosed in U.S. Pat. No. 4,838,287. This product allows the spatter accumulation to be removed with no physical contact to the welding nozzle and with no requirement for the operator to get close enough to the welding nozzle to be burned. This product also can be utilized with an automated welding system application such that the electromagnetic cleaner is placed within reach of an automated welding system, where periodically the automated welding system would automatically move the welding nozzle over to the cleaning station to have the spatter accumulation removed. The product allows the automated welding system to clean the nozzle and continue operation without being shut down. Since the welding nozzle is cleaned often, the life of the welding nozzle is also increased so that it need not be replaced as often as it would without the cleaning procedure.

However, this product does not work well with a metal welding nozzle because the spatter bonds very strongly to the metal welding nozzle. Typically this product will only be used effectively with a welding nozzle made from either a ceramic or a carbon composite material Characteristics of carbon composite or ceramic materials make welding nozzles made therefrom resistant to adhesion and to pitting. The resistance to adhesion allows the use of the electromagnetic cleaner to efficiently remove spatter from the various elements of the ceramic or carbon composite welding nozzles.

In process, the ceramic or carbon composite welding nozzle may be dipped in water prior to cleaning in order to solidify the spatter. The electromagnetic field will not be effective if the spatter is in a liquid or molten state, so the water dip is necessary to insure that the spatter is completely hardened. After dipping the welding nozzle in water, the welding nozzle is moved to the electromagnetic station and the hardened spatter droplets are pulled off magnetically.

Another measure utilized to prevent spatter accumulation or to at least make spatter removal easier are anti-spatter compounds. These compounds can be liquid, gel, or an aerosol spray. When placed on the part to be welded prior to welding, the anti-spatter agent will act as a barrier between the molten droplets of metal and the welding nozzle to either prevent or weaken the bond to the welding nozzle after the molten metal droplets cool. Use of an anti-spatter compound generally slows the accumulation of spatter on the welding nozzle and makes for the easier removal of any spatter that accumulates on the welding nozzle. However, the usefulness of the anti-spatter compounds is limited in that unless applied before each weld, the anti-spatter compound will be consumed with successive welds, thereby requiring frequent shutdowns of the welding operation to manually apply fresh anti-spatter compound to the welding nozzle. Each stop makes the cycle time longer, and also requires an operator to manually apply the anti-spatter compound. Generally, the use of anti-spatter compounds in this manner has had minimal beneficial effects due to the labor-intensive nature of the application in any manufacturing setting.

Welding nozzle replacement is another significant cause of downtime on a welding operation. As a welding nozzle is used, it wears out due to arcing and abrasion. Friction and/or conductivity between the continuous electrode and the passage for the electrode in the welding nozzle causes the passage in the welding nozzle to become out of round and enlarged, which, in turn, permits the continuous electrode to move around in an uncontrolled manner within the passage. Such action eventually causes inaccuracy in the weld and eventually requires that the welding nozzle be replaced. To prevent or postpone this wear on the welding nozzle, feeders have been developed to feed the continuous electrode to the welding nozzle in a defined manner, because some contact between the electrode and the welding nozzle has been found to bear on the repeatable accuracy of the weld. Lubricants can also be applied to the continuous electrode to reduce the friction and the conductivity between the continuous electrode and the welding nozzle.

SUMMARY OF THE INVENTION AND ADVANTAGES

Various methods and/or systems are disclosed for providing an improved welding system and/or method that substantially improves the length of time of continuous operation for an automated welding system between maintenance shutdowns. One of the disclosed method steps or system elements provides for dipping a welding nozzle [28 or 28a] and a portion of its related diffuser into a bath [12 or 12a] of fluid each time the automated welding system moves through a welding cycle. A product that may best accomplish this step or element is also disclosed.

Another method step or system element may include the removal of spatter accumulation via an electromagnetic field that magnetically pulls the spatter without direct contact with the nozzle or diffuser. A further disclosed method step or system element includes lubrication of the continuous electrode used for welding, and may include a step prior to lubrication that involves cleaning the continuous electrode prior to adding lubricant. The steps may vary as to whether or not they are included, or in what sequence, in accordance with such factors as the type of material used for the nozzle, the feeder used, the type of continuous electrode used, the type of spatter removal system to be used, the welding apparatus used, the welding environment (such as the inert gases used), and the welding application, i.e., what material is being welded to what material, and other factors. In each system or combination of method steps disclosed, however, a significant increase in time of continuous operation between maintenance shutdowns has occurred, providing significant cost savings and higher productivity for the same machine. Products for implementing the systems and/or methods are also disclosed, as well as a product that will hold or combine various products as needed for a selected system and/or method.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5a is a cross sectional view of the fluid bath apparatus having no release agent included in the fluid;

DETAILED DESCRIPTION OF THE EMBODIMENTS

Figure 5:
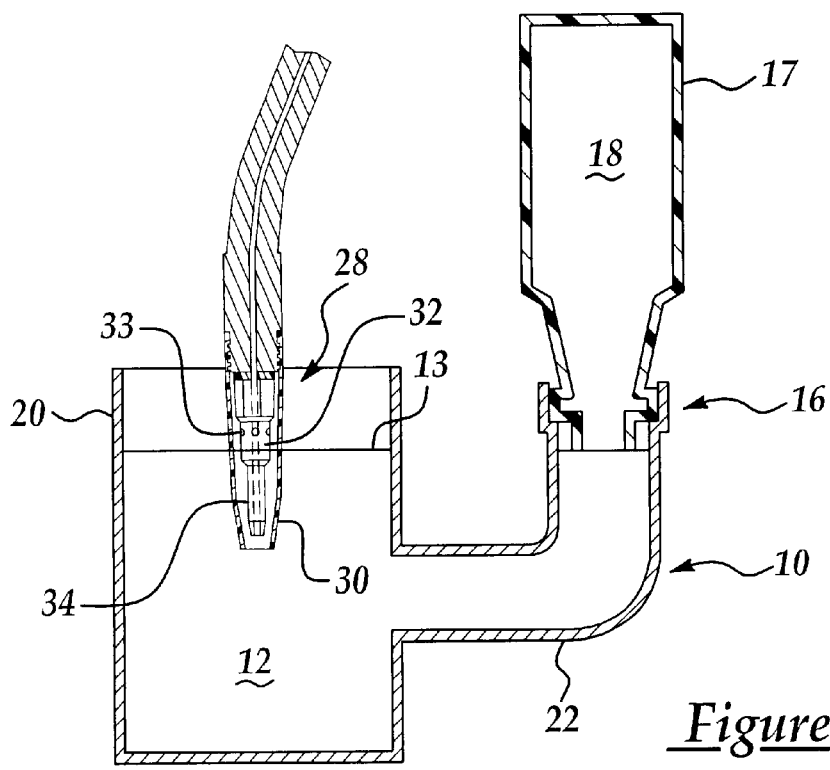
FIG. 5a is a cross sectional view of the fluid bath apparatus having a release agent included in the fluid.
Figure 5A:
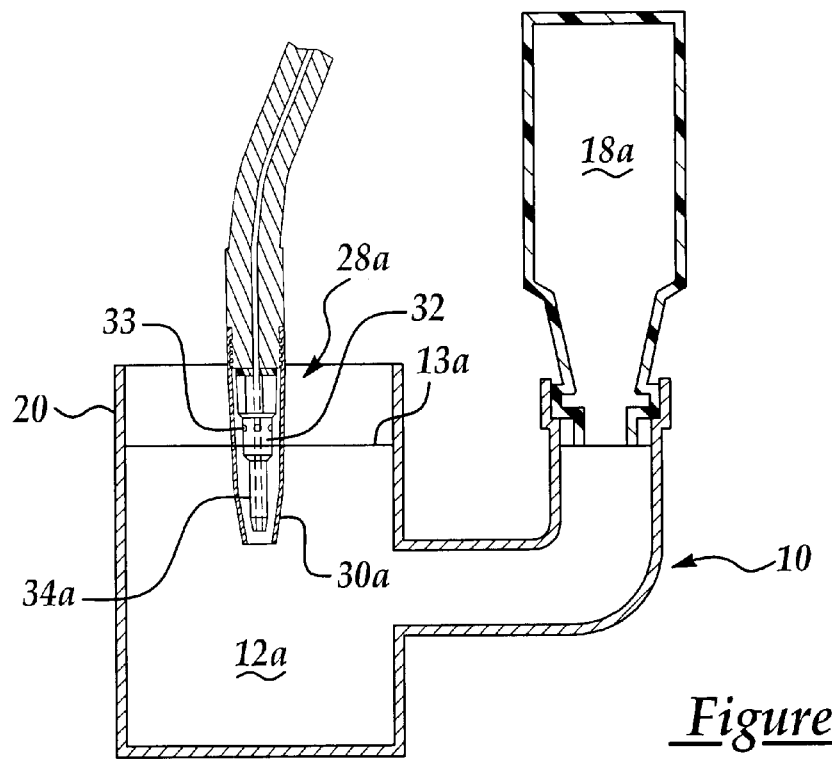

Referring to the Figures, wherein like numerals indicate like or corresponding parts throughout the several views, with particular reference to FIG. 5, an apparatus 10 for providing a bath 12 of a fluid to an automated welding system 14 is shown at 10. The apparatus 10 includes a port 16 for the adaptation of a feed container 17 of fluid 18, a reservoir 20 which is accessible to atmosphere, and a passageway 22 for communication between said feed container 18 and said reservoir 20. The port 16 is preferably comprised of a connection between a threaded spout 5 to the feed container 17 containing the fluid 18 and a mated threaded et 19 to the passageway 22. The apparatus 10 further provides means for maintaining the fluid bath 12 at a constant level within the reservoir 20 until the feed container 18 is exhausted. The relationship between the reservoir 20 and the feed container 18 is such that the apparatus 10 provides a balance between the surface tension of the fluid within the reservoir 20 and in contact with the atmosphere against the head created by the feed container 18 in communication with said passageway 22. This relationship allows the level of the fluid bath 12 within the reservoir 20 to be maintained at a constant level as long as additional fluid remains within the feed container 18. As the fluid bath 12 within the reservoir 20 is used, the volume of the fluid bath 12 within the reservoir 20 is replenished via the passageway 22 between the reservoir 20 and the feed container 18.

Figure 3:
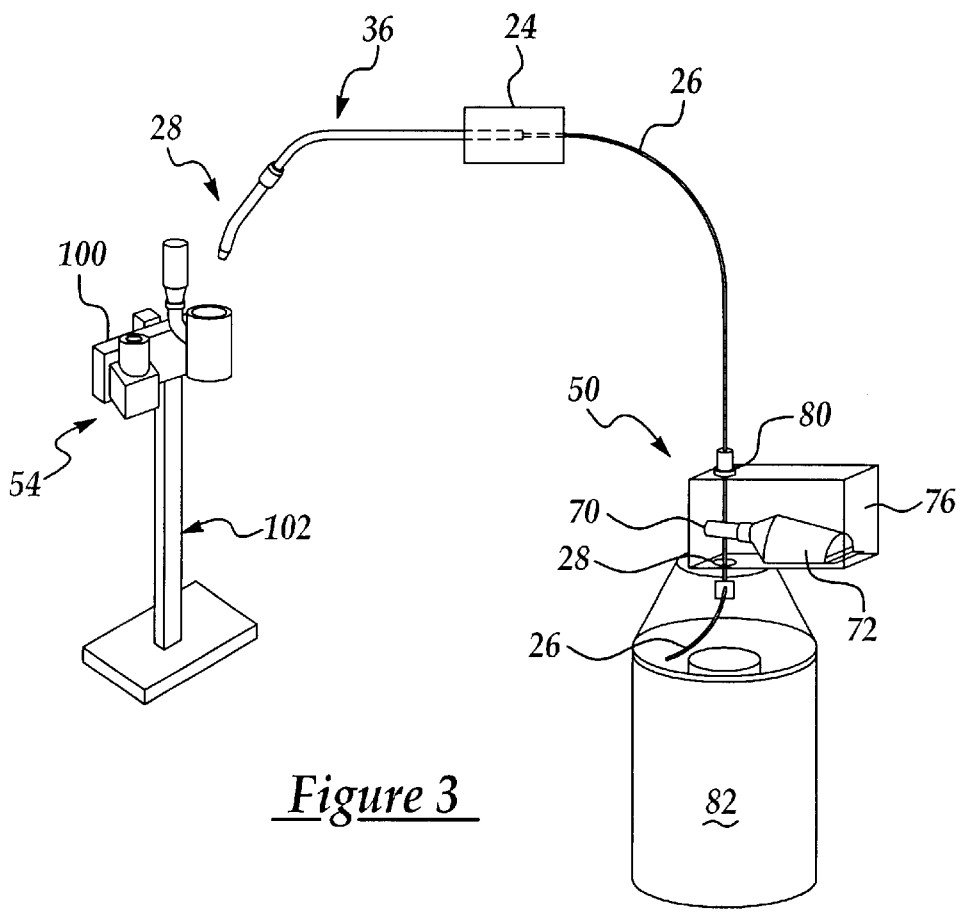
FIG. 3 is a schematic view showing a continuous electrode, lubricating device, feed mechanism, welding nozzle, and the fluid bath apparatus as used in FIG. 1.

With reference to FIG. 3, an example method of using the apparatus 10 to increase the duty cycle of an automated welding system 14 includes the steps of using a continuous electrode feeder device 24 to feed the continuous electrode 26 to and through a welding nozzle 28, applying a friction reducing agent to the continuous electrode 26 as it is fed by said feeder device 24 to said welding nozzle 28, dipping said welding nozzle 28 into a fluid bath 12 contained within said reservoir portion 20 of said apparatus 10 following a welding cycle, and utilizing an electromagnetic spatter removal system 54 to remove spatter from said welding nozzle 28. The continuous electrode feed mechanism 24 is used to insure that the continuous electrode 26 is consistently and smoothly feed to the welding nozzle 28, and the friction reducing agent is applied to increase the feedability of continuous electrode 26 into and through the welding nozzle 28 and to reduce the amount of improve the conductivity for the length of the welding nozzle 28. The friction reducing agent is preferably applied by means of a continuous electrode lubricator 50 having an applicator 70 fed via a wicking action from a reservoir 72, which can be disposed in a housing 76, having a inlet passageway 78 and an outlet passageway 80. The housing 76 is preferably disposed between the feeder 24 and the supply container 82 (or source) for the continuous electrode 26.

Each welding nozzle 28 is comprised of a nozzle shroud 30, a gas diffuser 32, and a tip 34. The welding nozzle 28 is mounted to a robot arm 36 in a conventional manner and is also attached to a continuous electrode feed tube 38 via a threaded collar 40. The gas diffuser 32 is connected to a source of preferable inert gas. Holes 33 in the gas diffuser 32 distribute the gas into the welding nozzle shroud 30 to control the welding environment at the weld.

Figure 6A:
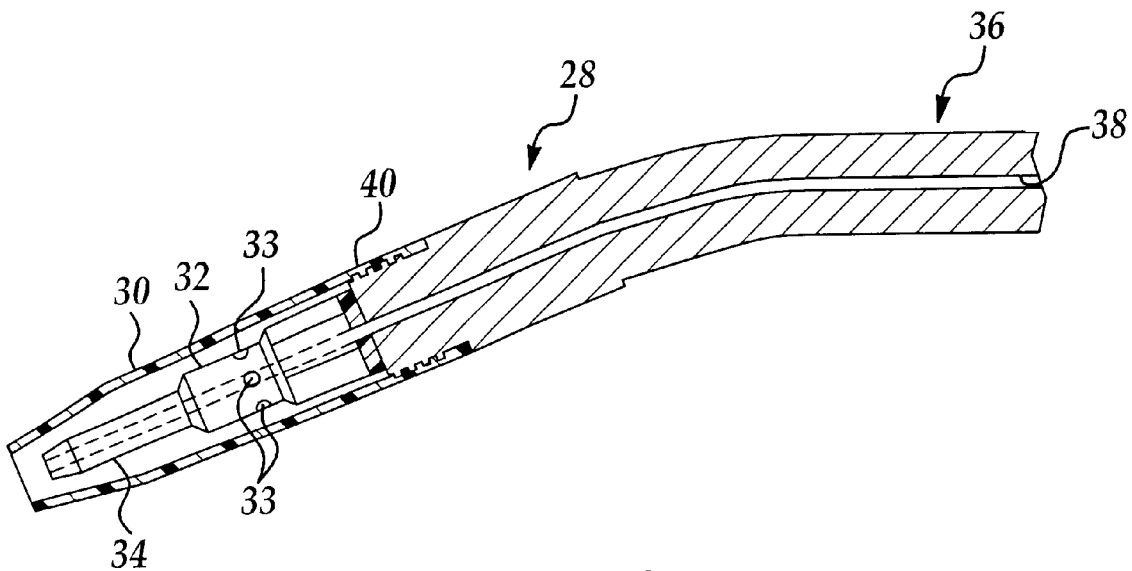
FIG. 6a is a cross sectional view of a nonmetal welding nozzle.
Figure 6B:
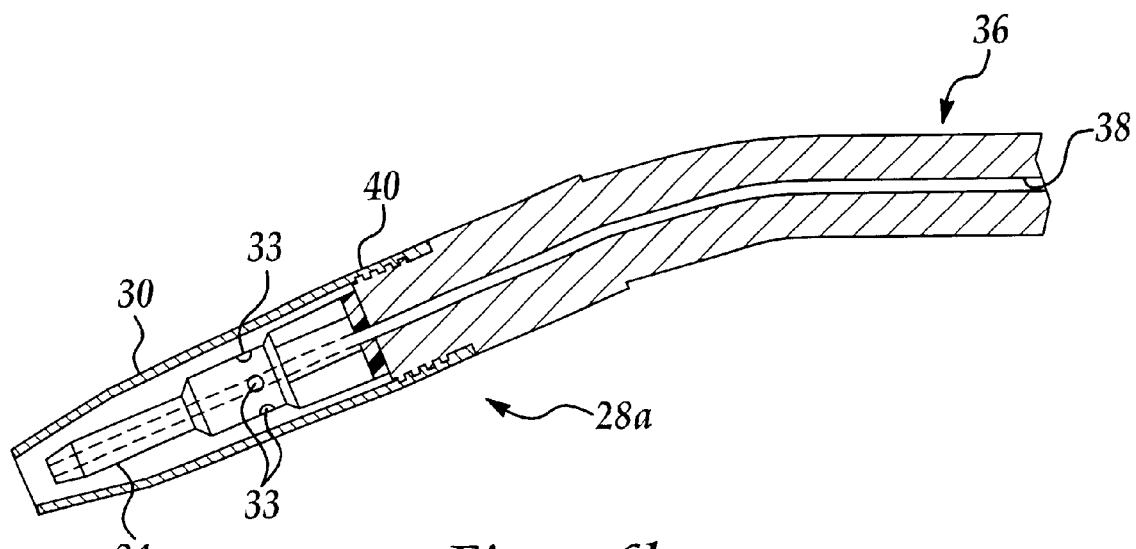
FIG. 6 is a cross sectional view of a metal welding nozzle.

With reference to FIGS. 6 or 6a, contact between the welding nozzle 28 and the continuous electrode 26 is desirable for stability and repeatability of electrode feed, but will cause the feed hole 35 in the welding nozzle 28 to become out of round or enlarged at some point, thereby requiring more frequent replacement of the welding nozzle 28, if high conductivity exists. Use of the friction reducing agent on the continuous electrode 26 will help reduce conductivity between the continuous electrode 26 and the welding nozzle 28, which increases the life of the welding nozzle 28 for repeatable welding of the parts to be welded.

For metal welding nozzles, the fluid bath 12 consists of a solution of water and a release agent. The release agent is used to prevent liquefied spatter that is deposited on the tip 34 and gas diffuser 32 of the welding nozzle 28 from forming a strong bond to the surface of tip 34 and gas diffuser 32 of the welding nozzle 28. The fluid bath 12 including the release agent is kept at a cool temperature in order to facilitate the hardening of the liquefied spatter. The temperature of the fluid bath 12 is dependent on the amount of time which the welding nozzle 28 is immersed within the release agent. The temperature of the fluid bath 12 including the release agent must be cool enough to cause the liquid spatter to completely harden within the amount of time that welding nozzle 28 is immersed. Typically, a release agent must be used when a metal welding nozzle 28 is utilized due to the high strength bonding which occurs between the spatter and the metal welding nozzle 28. The release agent is necessary to insure that the bonding between the welding nozzle 28 and the spatter is inhibited sufficiently to allow the spatter to be removed without damaging the welding nozzle 28.

Typically, as shown in FIG. 5, the welding nozzle 28 is dipped into the fluid bath 12 so that the surface 13 of the fluid bath 12 is disposed approximately ¼ inch from the holes 33 of the gas diffuiser 32 so that no fluid enters the inside of the gas diffuser 32 via the diffusion holes 33 at any time.

After the welding nozzle 28 has been dipped within the fluid bath 12 including the release agent, the welding nozzle 28 is then removed from the fluid bath 12 and positioned at its next station above an electromagnetic spatter removal system 54. The spatter must be completely hardened in order for the electromagnetic spatter removal system 54 to work correctly. The electromagnetic spatter removal system 54 uses magnetic fields to attract the spatter and pull the spatter from the welding nozzle 28, such as that described above and shown in U.S. Pat. No. 4,838,287. This process step or system element will not work on spatter that is still liquefied. The steps or elements of dipping the welding nozzle 28 within the fluid bath 12 including the release agent and subsequently utilizing the electromagnetic spatter removal device 4 are performed periodically each time the automated welding system 14 cycles a predetermined number of times.

A different example method or system of using the fluid bath apparatus 10 to increase the duty cycle (i.e., on duty, between shutdowns) of an automated welding system 14 includes the steps or elements of using a continuous electrode feed mechanism 24 to feed the continuous electrode 26 to a welding nozzle 28, applying a friction reducing agent to the continuous electrode 26 as it is fed through the feed device 24 to the welding nozzle 28, dipping the welding nozzle 28 into a fluid bath 12 contained within said reservoir portion 20 of said apparatus 10 following a welding cycle (preferably where the surface of the fluid bath is disposed approximately ¼ inch from the holes 33 of the gas diffuser 32, and utilizing an electromagnetic spatter removal system 54 to remove spatter from said welding nozzle 28. In place of the metal welding nozzle 28, however, a ceramic welding nozzle 28a is utilized. A ceramic welding nozzle 28a is more resistant to bonding of the spatter, thereby making the spatter removal easier. The inherent resistance to bonding displayed by the ceramic welding nozzle 28a makes the use of a release agent in the fluid bath 12 unnecessary. Therefore, instead of dipping the welding nozzle 28 into a fluid bath 12 of water and a release agent, the welding nozzle 28a is dipped into a fluid bath 12a consisting of only water. Just as with the release agent, the water only fluid bath 12a must be kept at a temperature which will allow the spatter to completely harden upon the welding nozzle 28a prior to utilizing the electromagnetic spatter removal system 54.

A additional example method of using the fluid bath apparatus 10 to increase the duty cycle of an automated welding system 14 includes only using the steps or elements of using a continuous electrode 26 feed mechanism to feed the continuous electrode 26 to a welding nozzle 28, dipping said welding nozzle 28 into a fluid bath 12 contained within the fluid bath 12 of said fluid bath apparatus 10 following a welding cycle, and utilizing an electromagnetic spatter removal system 54 to remove spatter from said welding nozzle 28. As previously discussed, the method can be practiced using a welding nozzle 28a made from ceramic materials rather than metal and dipping the welding nozzle 28a within a fluid bath 12a of only water rather than a release agent to harden the spatter deposited on the welding nozzle 28a. Alternatively, if a metal welding nozzle 28 is used, a release agent plus water is recommended.

An additional example method of using the fluid bath apparatus 10 to increase the duty cycle of an automated welding system 14 includes the steps of using a continuous electrode feed mechanism 24 to feed the continuous electrode 26 to a welding nozzle 28, dipping said welding nozzle 28 into a fluid bath 12 of said apparatus 10 following a welding cycle, and using a scraper or brush to remove the hardened spatter from the welding nozzle 28. An impact device or a reamer may be other alternatives to remove the hardened spatter from the welding nozzle 28. As previously discussed, the method or system can be practiced using a metal welding nozzle 28 and a fluid bath 12 including a release agent, or a ceramic welding nozzle 28a and a water fluid bath 12a to harden the spatter deposited on the welding nozzle 28 or 28a, respectively. Although the electromagnetic spatter removal system 54 is not utilized in the present method, the release agent or water must still be maintained at a temperature which will facilitate the complete hardening of the deposited on the welding nozzle 28 or 28a, respectively. Removal of the spatter by scraping, brushing, reaming, or impacting does involve some manual labor, but the removal process has been found to be more efficient than those previously known, particularly when the spatter is completely hardened by the dipping of the welding nozzle 28 or 28a in the fluid bath 12 or 12a, respectively. The steps or elements of dipping the welding nozzle 28 or 28a within the fluid bath 12 or 12a and subsequently removing the hardened spatter by brushing, scraping, reaming, or impacting the hardened spatter from the welding nozzle 28 or 28a are performed periodically at shutdown subsequent to each time the automated welding system 14 cycles a predetermined number of times. This method will improve the amount of time between shutdowns, but is not recommended to be as significant as the other methods and/or systems described above.

Figure 1:
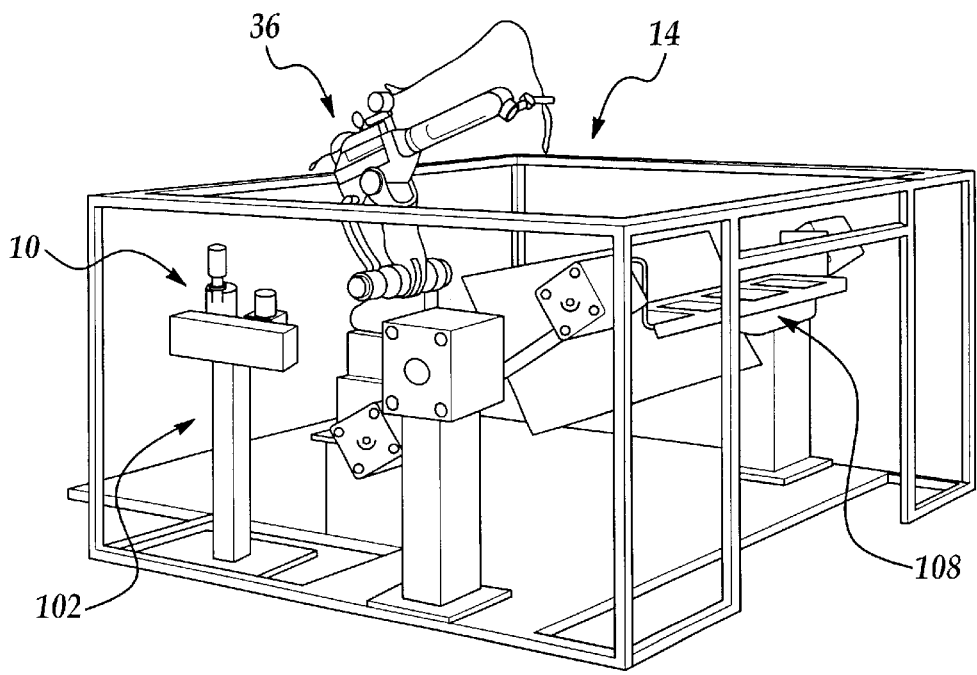
FIG. 1 is a perspective view of an automated welding system.
Figure 2:
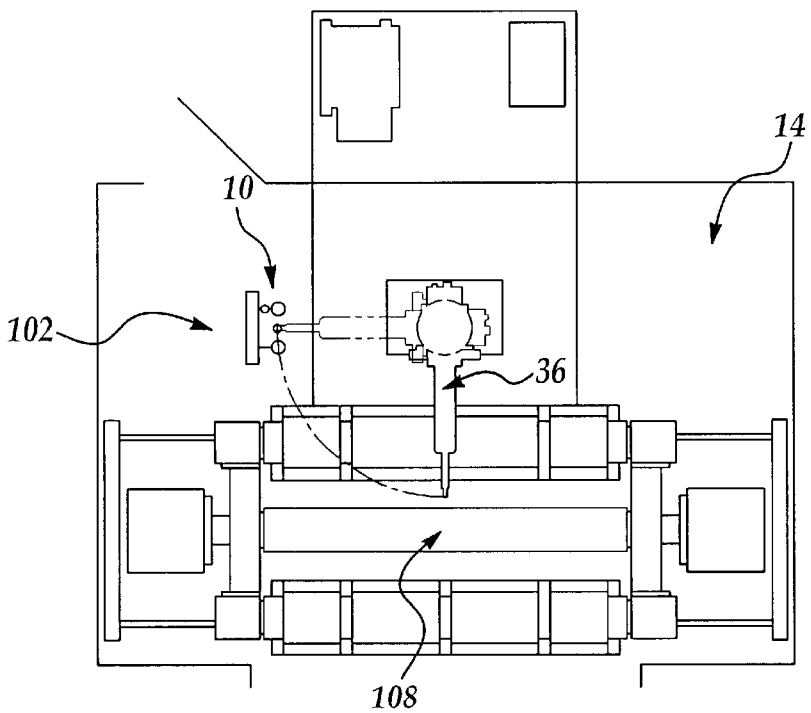
FIG. 2 is a top view of the automated welding system of FIG. 1.
Figure 4:
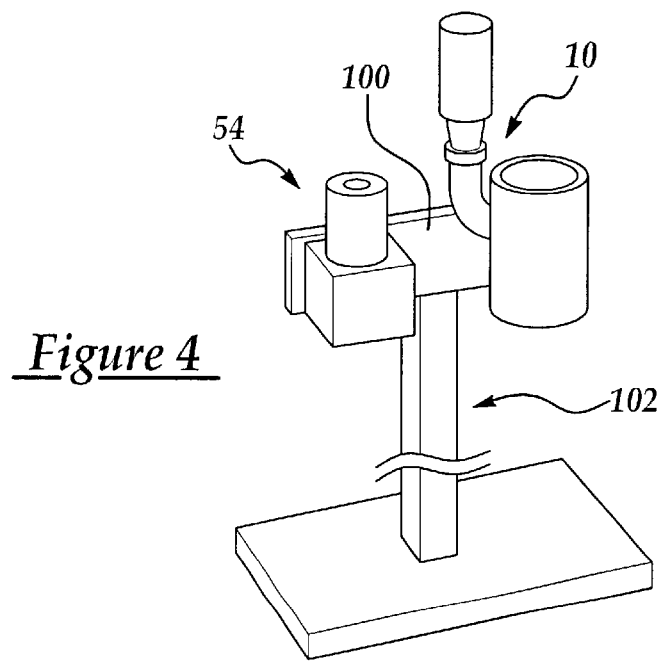
FIG. 4 is a perspective view of the fluid bath apparatus mounted to a common bracket along with an electromagnetic spatter removal system as shown in FIG. 1.

Referring to FIGS. 1 and 2, an automated welding system utilizing the fluid bath apparatus 10 is shown at 14. Referring to FIG. 3, a schematic is shown which details the path of the continuous electrode 26 as it is fed from a spool through a continuous electrode lubricator 50 to the welding nozzle 28. FIGS. 3 and 4 illustrate the mounting of the fluid bath apparatus 10 via bolt fasteners or similar fasteners onto a bracket 100 along with the electromagnetic spatter removal system 54, similarly mounted with bolt fasteners or similar fasteners. As shown in FIG. 4, this bracket 100 is then affixed to a stand 102 via suitable fasteners (or may be fastened by welding or any other desired type of fastening that will retain its fastening in the environment in which the robot is maintained). The stand 102 is placed in a suitable location, as shown in FIG. 4, to be reached by the robot arm 36 for placement of the welding nozzle 28 or 28a at an appropriate time in the cycle.

With reference to FIGS. 1 and 2, the stand 102 is preferably placed within the automated welding system 14, but away from the area 108 in which welding is performed. As shown, the stand 102 is disposed at a location approximately 90 degrees clockwise from the working area 108 as viewed from above. The fluid bath apparatus 10 and the electromagnetic spatter removal system 54 are placed in sequence on the stand 102 so that one is less than 90 degrees clockwise from the work area 108 as viewed from above and the other is more than 90 degrees clockwise from the work area 108 as viewed from above, so that the operation steps or elements can be sequential, if so desired.

Figure 7:
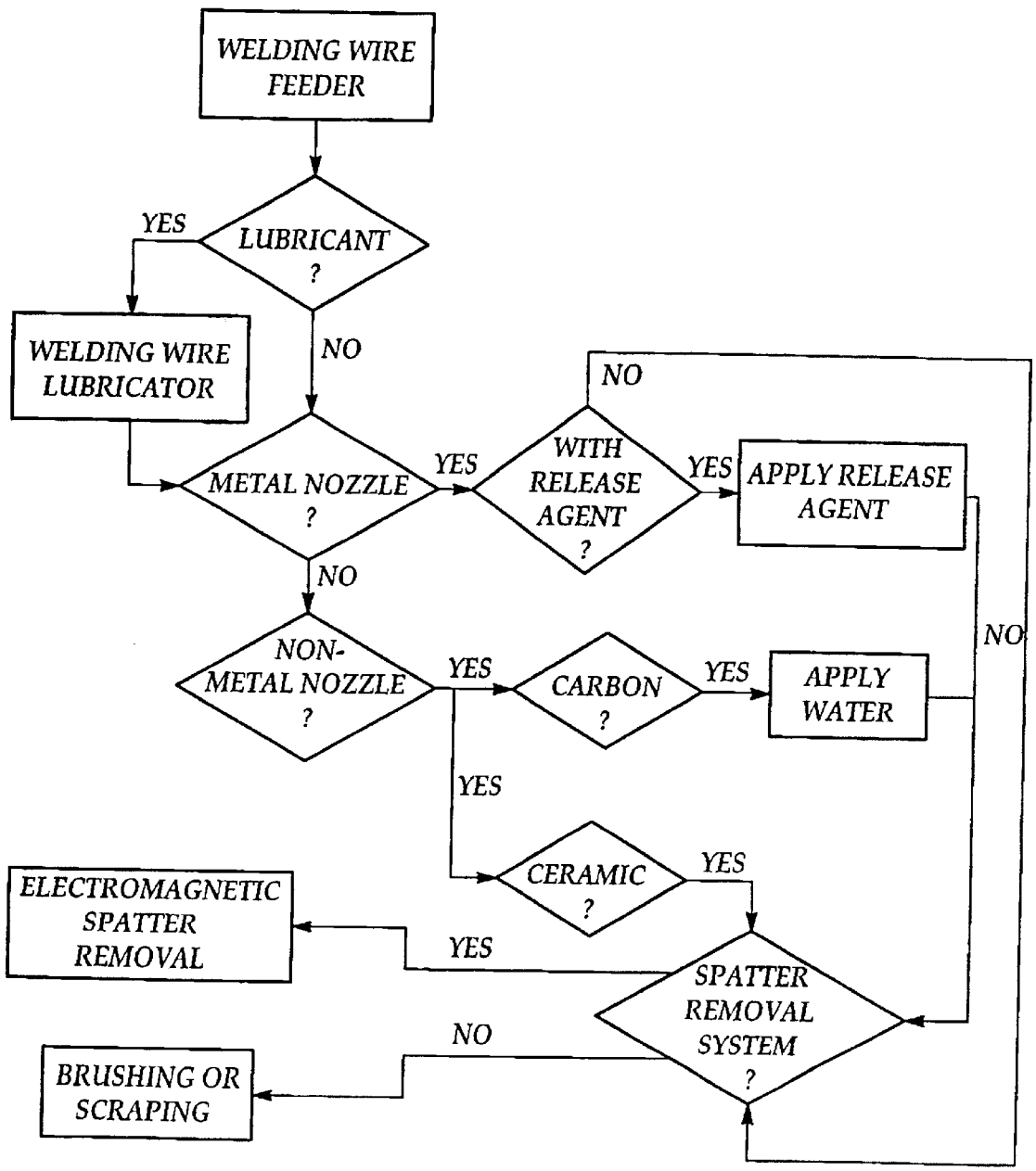
FIG. 7 is a flow diagram outlining possible methods or systems of using the various components of the automated welding system.

Referring to FIG. 7, a flow chart is shown which illustrates the possible methods or systems of use as described above. As shown, the flow chart begins with a continuous electrode feed mechanism 24 that may be used to feed the continuous electrode 26 from a spool to the welding nozzle 28. A continuous electrode lubricator 50 may be located immediately after the spool to apply lubricant to the continuous electrode 26. The lubricant will reduce friction and/or conductivity as the continuous electrode 26 is fed to the welding nozzle 28 or 28a, and will reduce friction and/or conductivity between the welding nozzle 28 or 28a and the continuous electrode 26 as the continuous electrode 26 passes through the welding nozzle 28 or 28a. Reduced friction and/or conductivity between the welding nozzle 28 or 28a and the continuous electrode 26 will reduce the amount of wear on the welding nozzle 28 or 28a, thereby increasing the life of the welding nozzle 28 or 28a. As shown in FIG. 7, the use of a continuous electrode lubricator 50 is optional, although it is preferable, but the method can be practiced without the continuous electrode lubricator at an improved efficiency, but less than the efficiency with the use of the lubricator 50.

The welding nozzle 28 or 28a can be made of either metal or ceramic material. If the welding nozzle 28 is made from metal, then the welding nozzle 28 is preferably dipped within a fluid bath 12 consisting of water and a release agent. The release agent is used to prevent liquefied spatter that is deposited on the welding nozzle 28 from forming a strong bond to the surface of the welding nozzle 28 and welding nozzle, and is kept at a cool temperature in order to facilitate the hardening of the liquefied spatter as described above.

If the welding nozzle 28a is made from a non-metal material, then the welding nozzle 28a is dipped within a fluid bath 12a of only water if it is a carbon nozzle. If the nozzle 28a is a ceramic nozzle, it need not be dipped other than if the spatter needs to be cooled, in which case some improvement over other uses of ceramic nozzles can be maintained. Thus, with ceramic nozzles this step is optional. The inherent resistance to bonding displayed by the carbon or ceramic welding nozzle 28a makes the use of a release agent unnecessary. Therefore, instead of dipping the welding nozzle 28 into a fluid bath 12 of water and a release agent, the welding nozzle 28a is dipped into a fluid bath 12 consisting of only water. Just as with the fluid bath 12 including the release agent, the fluid bath 12a of water must be kept at a temperature which will allow the spatter to completely harden upon the welding nozzle 28a. The fluid bath apparatus 10 is used to present the fluid bath 12a to the welding nozzle 28a in a manner that the welding nozzle 28a can be dipped within the solution as described above.

After the welding nozzle 28 or 28a has been dipped within the fluid bath 12 or 12a (or otherwise as indicated in FIG. 7 as to ceramic nozzles), then the welding nozzle 28 or 28a is positioned so that any spatter which has accumulated upon the welding nozzle 28 or 28a can be removed by either an electromagnetic spatter removal system 54 or by brushing, reaming, scraping, or impacting (such as with a hammer) the spatter from the welding nozzle 28 or 28a. The electromagnetic spatter removal system 54 uses magnetic fields to attract the spatter and pull the spatter from the welding nozzle 28 or 28a. If the electromagnetic spatter removal system 54 is not used, then any spatter that has accumulated upon the welding nozzle 28 or 28a can be removed manually by either scraping, brushing, reaming or otherwise impacting the spatter from the welding nozzle 28 or 28a. The steps of dipping the welding nozzle 28 or 28a within the release agent or water and subsequently utilizing the electromagnetic spatter removal device 54 or scraping, reaming, brushing or otherwise impacting the spatter from the welding nozzle 28 or 28a are performed periodically each time the automated welding system 14 cycles a predetermined number of times.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An apparatus for providing a bath of a fluid to an automated welding system, said apparatus providing a port for the adaptation of a feed container, said apparatus including a reservoir which is accessible to atmosphere, said apparatus further including a passageway for communication between said feed container and said reservoir, said apparatus further including means for maintaining said fluid bath at a constant level within said reservoir until said feed container is exhausted.

2. The apparatus as described in claim 1, wherein said apparatus provides a balance between the surface tension of said fluid within said reservoir and in contact with the atmosphere against the head created by said feed container in communication with said passageway.

3. A method for increasing the duty cycle of an automated welding system including the steps of:
- using a continuous electrode feed device to deliver said continuous electrode to a welding nozzle,
- applying a friction reducing agent to the continuous electrode as it is fed through said feed device to said welding nozzle,
- dipping said welding nozzle into a release agent following a welding cycle, and
- utilizing an electromagnetic spatter removal system to remove spatter from said welding nozzle.

4. The method described in claim 3, wherein said release agent is at a temperature appropriate to facilitate the hardening of liquefied spatter on said welding nozzle within the time for which said welding nozzle is dipped within said release agent.

5. The method described in claim 4, wherein said automated welding system employs a welding nozzle made from metal.

6. The method described in claim 5, wherein said electromagnetic spatter removal system is utilized on said welding nozzle periodically at a predetermined number of cycles.

7. A method for increasing the duty cycle of an automated welding system including the steps of:
- using a continuous electrode feed device to deliver said continuous electrode to a welding nozzle,
- applying a friction reducing agent to the continuous electrode as it is fed through said feed device to said welding nozzle,
- dipping said welding nozzle into water following a welding cycle,
- utilizing a electromagnetic spatter removal system to remove spatter from said welding nozzle.

8. The method described in claim 7, wherein said water is at a temperature appropriate to facilitate the hardening of liquefied spatter on said welding nozzle within the time for which said welding nozzle is dipped within said water.

9. The method described in claim 8, wherein said automated welding system employs a welding nozzle made from ceramic.

10. The method described in claim 9, wherein said electromagnetic spatter removal system is utilized on said welding nozzle periodically at a predetermined number of cycles.

11. A method for increasing the duty cycle of an automated welding system including the steps of:
- using a continuous electrode feed device to deliver said continuous electrode to a welding nozzle,
- dipping said welding nozzle into a release agent following a welding cycle,
- utilizing a electromagnetic spatter removal system to remove spatter from said welding nozzle.

12. The method described in claim 11, wherein said release agent is at a temperature appropriate to facilitate the hardening of liquefied spatter on said welding nozzle within the time for which said welding nozzle is dipped within said release agent.

13. The method described in claim 12, wherein said automated welding system employs a welding nozzle made from metal.

14. The method described in claim 13, wherein said electromagnetic spatter removal system is utilized on said welding nozzle periodically at a predetermined number of cycles.

15. A method for increasing the duty cycle of an automated welding system including the steps of:
- using a continuous electrode feed device to deliver said continuous electrode to a welding nozzle,
- dipping said welding nozzle into water following a welding cycle,
- utilizing a electromagnetic spatter removal system to remove spatter from said welding nozzle.

16. The method described in claim 15, wherein said water is at a temperature appropriate to facilitate the hardening of liquefied spatter on said welding nozzle within the time for which said welding nozzle is dipped within said water.

17. The method described in claim 16, wherein said automated welding system employs a welding nozzle made from ceramic.

18. The method described in claim 17, wherein said electromagnetic spatter removal system is utilized on said welding nozzle periodically at a predetermined number of cycles.

19. A method for increasing the duty cycle of an automated welding system including the steps of:
- using a continuous electrode feed device to deliver said continuous electrode to a welding nozzle,
- applying a friction reducing agent to the continuous electrode as it is fed through said feed device to said welding nozzle,
- dipping said welding nozzle into a release agent following a welding cycle.

20. The method described in claim 19, wherein said release agent is at a temperature appropriate to facilitate the hardening of liquefied spatter on said welding within the time for which said welding nozzle are dipped within said release agent.

21. The method described in claim 20, wherein said automated welding system employs a welding nozzle made from metal.

22. The method described in claim 21 including the step of removing spatter from said welding nozzle by scraping or brushing.

23. The method described in claim 22, wherein spatter is removed from said welding nozzle periodically at a predetermined number of cycles.

24. A method for increasing the duty cycle of an automated welding system including the steps of:
- using a continuous electrode feed device to deliver said continuous electrode to a welding nozzle,
- applying a friction reducing agent to the continuous electrode as it is fed through said feed device to said welding nozzle,
- dipping said welding nozzle into water following a welding cycle.

25. The method described in claim 24, wherein said water is at a temperature appropriate to facilitate the hardening of liquefied spatter on said welding nozzle within the time for which said welding nozzle is dipped within said water.

26. The method described in claim 25, wherein said automated welding system employs a welding nozzle made from ceramic.

27. The method described in claim 26 including the step of removing spatter from said welding nozzle by scraping or brushing.

28. The method described in claim 27, wherein spatter is removed from said welding nozzle periodically at a predetermined number of cycles.

* * * * *